US009164766B1

(12) United States Patent
Wong et al.

(10) Patent No.: US 9,164,766 B1
(45) Date of Patent: Oct. 20, 2015

(54) SYSTEM AND METHOD FOR HARDWARE ASSISTED STACK

(75) Inventors: Aron L. Wong, Mountain View, CA (US); Dennis K. Ma, San Jose, CA (US); Jonah M. Alben, San Jose, CA (US); Mark S. Krueger, New Berlin, WI (US); Jeffrey J. Irwin, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2457 days.

(21) Appl. No.: 11/102,189

(22) Filed: Apr. 8, 2005

(51) Int. Cl.
*G06F 9/30* (2006.01)

(52) U.S. Cl.
CPC .................. *G06F 9/30134* (2013.01)

(58) Field of Classification Search
None
See application file for complete search history.

(56) References Cited

U.S. PATENT DOCUMENTS

| 6,516,410 | B1 * | 2/2003 | Heller ............................... 713/2 |
| 7,287,140 | B1 * | 10/2007 | Asanovic et al. ............. 711/163 |
| 7,320,125 | B2 * | 1/2008 | Elliott et al. .................. 717/131 |
| 2003/0217255 | A1 * | 11/2003 | Wyatt ........................... 713/100 |

* cited by examiner

*Primary Examiner* — Maurice L McDowell, Jr.
(74) *Attorney, Agent, or Firm* — Artegis Law Group, LLP (57) ABSTRACT

Methods and apparatus for providing additional storage, in the form of a hardware assisted stack, usable by software running an environment with limited resources. As an example, the hardware assisted stack may provide additional stack space to VBIOS code that is accessible within its limited allocated address space.

17 Claims, 7 Drawing Sheets

SYSTEM AND METHOD FOR HARDWARE ASSISTED STACK

BACKGROUND OF THE INVENTION

1. Field of the Invention

This invention relates generally to shared stacks in computing devices and more specifically to a system and method for a hardware assisted stack that may alleviate demands on a shared stack.

2. Description of the Related Art

Under the typical operating environment of a personal computer (PC), when the PC is powered up, it undergoes a boot process. This boot process typically involves one or more self-tests and executing a boot program stored permanently in read only memory (ROM) that contains the PC's basic input/output system (SBIOS) code. The SBIOS code typically performs a number of initialization routines (e.g., initializing main memory, disk drives, etc.) that prepare the system for normal usage.

The SBIOS may also call other routines in ROM (referred to as Option ROM functions) to perform various initialization routines. The routines to initialize a display device, commonly referred to as the video BIOS (or VBIOS) is one example of such an Option ROM. There is no standard specification which guarantees the amount of writeable memory (stack) space for Option ROMs. Therefore, when calling an Option ROM function, such as VBIOS, adequate local stack space must be provided for the ROM functionality to operate properly.

Unfortunately, there is typically only a limited amount of stack space available as a shared resource to all processes running at any given time. The amount of stack space required to be passed to the VBIOS is not typically defined, and a certain level of compatibility is typically empirically confirmed by execution of a number of existing (or "legacy") software/hardware configurations. Newer products typically are designed to be backwards compatible with many legacy system configurations. Thus, the design typically includes empirically checking that the VBIOS does not exceed the stack usage limitations of these legacy configurations.

However, increasingly complex support requirements of newer PC configurations beyond the original IBM VGA design (e.g., to support multiple display heads, flat panels, high definition television-HDTV displays, and the like) have resulted in more complex software in the VBIOS. This increase in complexity tends to conflict with the stack usage limitations of legacy systems, as more stack space is required. In other words, the code added to VBIOS to support these increasingly complex requirements tends to consume more and more of a very limited resource (the stack) that all the software running in that environment has to share.

Eventually, a collision may occur where some software code runs out of stack space with potentially catastrophic effects. For example, return addresses pushed onto the stack may be lost such that programs that made calls to routines may not be able to return to the proper location in the code (from where the call was made), other types of precious data may be lost, and the PC may be rendered unusable. Access to additional memory resources that could be used by the VBIOS to accommodate increased stack requirements are limited, as the VBIOS execution environment does not allow for dynamic memory allocation from which a new stack may be created.

Accordingly, what is needed is a method and system to provide additional stack space in systems with limited shared stack resources.

SUMMARY OF THE INVENTION

One embodiment provides a method of reducing the impact of software code on a shared stack of a computing system in which the software code is running. The method generally includes, prior to executing a portion of the software code, offloading a portion of data from the shared stack to a hardware assisted stack mapped to an address space accessible to the software code, executing the portion of the software code, and subsequently, restoring the offloaded portion of data from the hardware assisted stack to the shared stack.

Another embodiment provides an integrated circuit (IC) device generally including a hardware assisted stack with a plurality of storage locations and interface circuitry. The interface circuitry is generally configured to detect externally supplied write operations targeting a specified input/output (I/O) location and, in response, push data contained in the write operations onto the hardware assisted stack, and to detect externally supplied read operations targeting the same or a different specified I/O location and, in response, pop data from the hardware assisted stack and return the popped data.

Another embodiment provides a system generally including at least one central processing unit (CPU), one or more software code portions executable by the CPU, a shared stack accessible by the software code portions, and a hardware assisted stack mapped to an address space accessible to at least a first one of the software code portions. The first software code portion is configured to, during its execution by the CPU, offload data from the shared stack to the hardware assisted stack.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide additional storage, in the form of a hardware assisted stack, usable by software running in an environment with limited resources. For example, the hardware assisted stack may provide additional stack space to VBIOS code that is accessible within its limited allocated address space. By having hardware assist in management of the storage space, the VBIOS can effectively 'switch stacks' from a shared stack to the hardware assisted stack during runtime. The hardware assistance may include managing the hardware assisted stack pointer so that the VBIOS does not need to explicitly track the number of items in the stack and/or manually adjust the stack pointer.

As used herein, the term stack generally refers to a storage mechanism that operates in a last-in first-out (LIFO) manner. In other words data most recently placed (or "pushed") onto the stack is the first data to be removed (or "popped") from the stack. A pointer mechanism indicates a current location in the stack to which data will be pushed or from which data will be popped. As a result, a location does not need to be specified when pushing or popping data to/from the stack. The following sequence illustrates the operation of a stack:

push D1 //pushes D1 on the stack at pointer location
    push D2 //pushes D2 on the stack at next location
    pop //returns D2 from the stack
    pop //returns D1 from the stack To facilitate understanding, embodiments of the present invention will be described below with reference to a hardware assisted stack integrated within a graphics processing unit (GPU) that is accessible by VBIOS code as a particular, but not limiting, application example. However, such a hardware assisted stack may also be provided as a standalone device or within any other type of (non-graphics) device, such as a device in a chipset, memory controller, memory device, central processing unit (CPU), or the like, to provide additional storage to any type of code running in a possibly resource limited environment.

An Exemplary System

Figure 1:
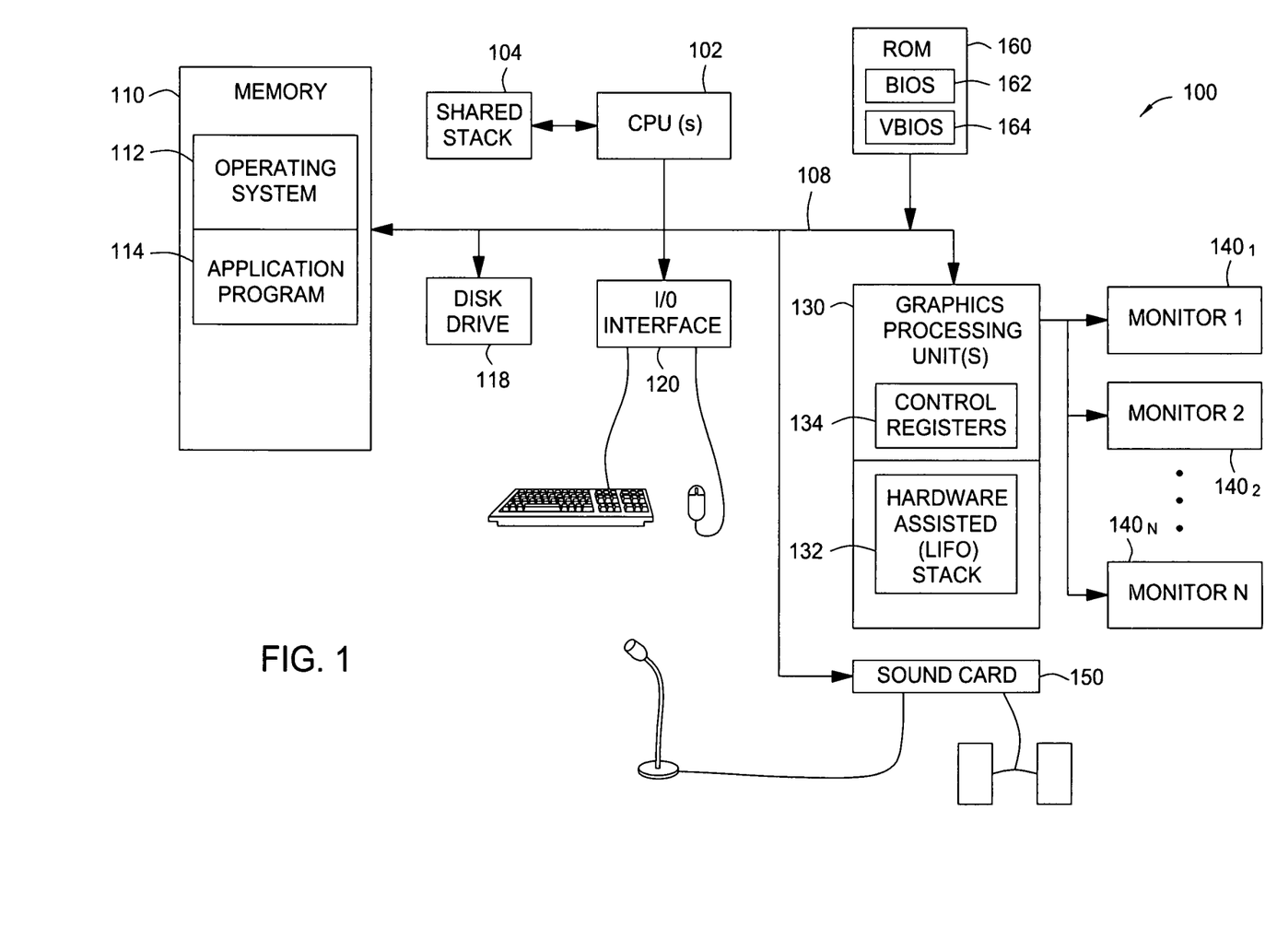
FIG. 1 illustrates an exemplary system utilizing a hardware assisted stack, according to one embodiment of the present invention.

FIG. 1 illustrates an exemplary computer system 100 in which embodiments of the present invention may be utilized. As illustrated, the system 100 may include one or more central processing units (CPUs) 102. During a boot process of the system 100, the CPU 102 may load and execute System BIOS code (SBIOS) 162 stored in read-only memory (ROM) 160. The ROM 160 may be any suitable type read-only memory, for example, including one time programmable read-only memory (OTPROM) or programmable flash memory, which would allow for updates.

This SBIOS code 162 may include routines to initialize various components of the system 100, such as a disk drive 118, I/O interface 120, and sound card 150, to prepare them for operation in the system 100. The CPU 102 may also load and execute video BIOS (VBIOS) code 164 in order to initialize and configure one or more display devices, such as monitors $140_{1...N}$ controlled by a GPU 130. VBIOS code 164 may also be located in ROM 160 (or a separate ROM) and, in some cases, could be part of or called from SBIOS code 162. In some cases, VBIOS code may also be provided separately, for example by a vendor of a graphics card including the GPU 130.

All the different pieces of software (e.g., SBIOS 162 and VBIOS 164) may be running at one time during startup and may make calls to each other to interact in various ways. One universal resource that is typically shared when running in startup (real) mode is the stack 104. In a typical VBIOS operating environment, the stack 104 is no more than 64K bytes, and there tends to be much less than the total amount actually available for use. In startup mode, system memory 110 (eventually used to load and execute an operating system 112 and application programs 114) is not yet initialized or controlled by a modern operating system, so all the pieces of code typically has to share this relatively small stack 104.

As previously described, in standard BIOS specifications, Option ROMs, such as VBIOS 164 are not guaranteed any dedicated writable memory (stack) space. However, the relatively complex initialization functions the VBIOS may need to perform (e.g., to prepare the monitors 140 for display) may require a substantial amount of stack space. For some embodiments, in an effort to provide an additional amount of stack space and reduce the amount of the shared stack 104 consumed by VBIOS 164, a hardware assisted stack (HW stack) 132 may be provided. Due to the typically limited size of the shared stack 104, the HW stack 132 may be virtually any size and still be useful. For example, an HW stack with 256 bytes may greatly reduce the impact on a 64 kb shared stack.

Providing Access to the Hardware Stack

Figure 2:
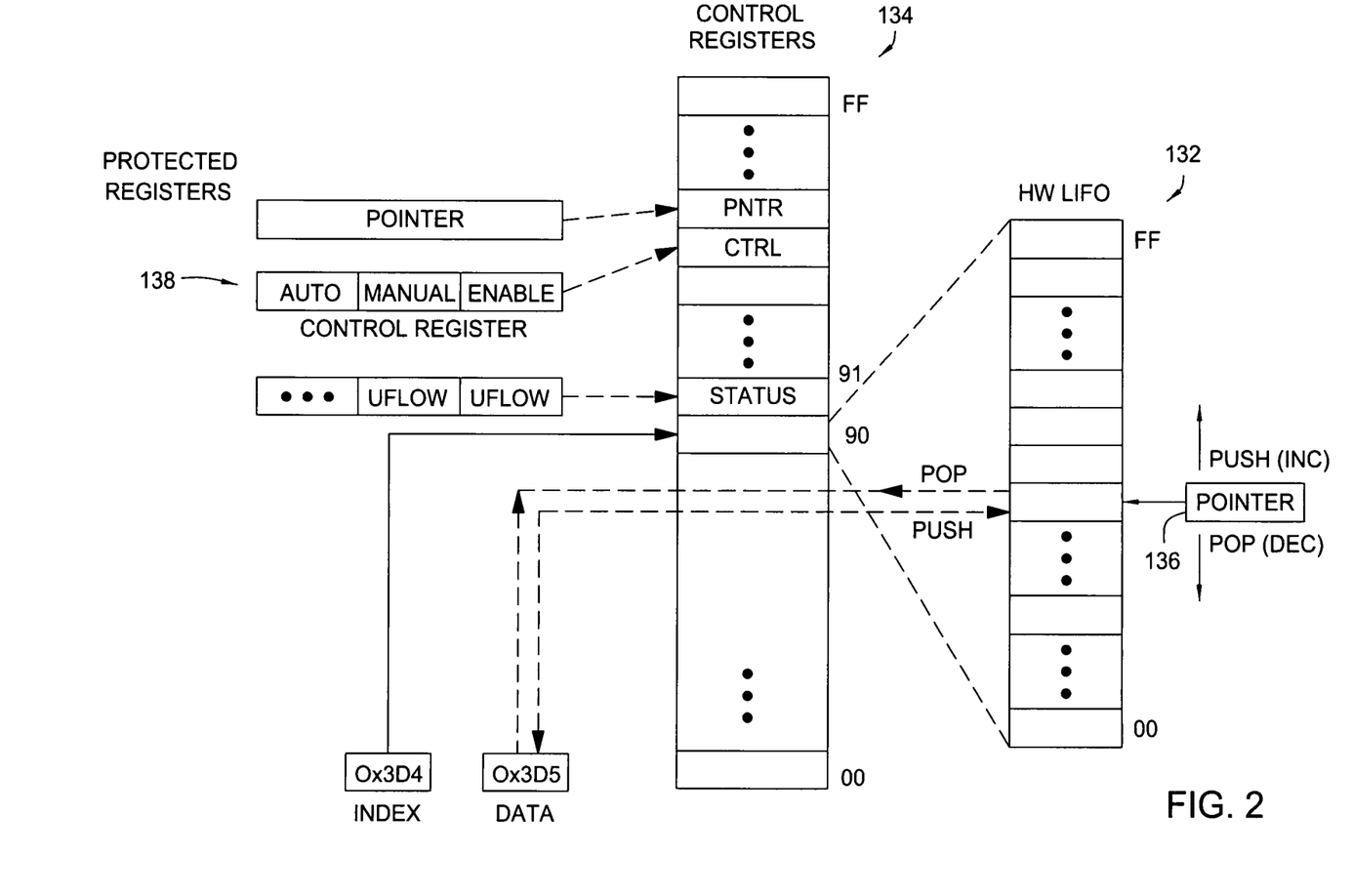
FIG. 2 illustrates I/O location mapping of a hardware assisted stack, according to one embodiment of the present invention.

As the VBIOS runs in real-mode, where only 16-bit memory addresses are directly generated and there is no memory mapping support, some sort of mechanism may be provided to allow access to the HW stack 132 within the limited address range available to the VBIOS (i.e., the VBIOS is typically only allowed to "touch" certain resources). One approach, illustrated in FIG. 2, is to map the HW stack 132 to one or more I/O locations commonly used by the VBIOS.

For example, the VBIOS commonly uses I/O locations 0x3D4 and 0x3D5 when accessing a color adapter of a VGA. The VGA may be designed such that the VBIOS may write an index to location 0x3D4 and data may be written to or read from location 0x3D5. In other words, assuming an 8-bit index written to location 0x3D4, the VBIOS may have access to 256 byte line registers 134 of the GPU. A write to location 0x3D5 stores data in the register pointed to by the index written to location 0x3D4, while a read from location 0x3D5 reads data from the indexed register. While not shown, circuitry on GPU may detect these writes/reads and access the HW stack accordingly.

For one embodiment, the HW stack 132 may be made accessible to the VBIOS in this manner. For example, referring to FIG. 2, a control register 0x90 (CR90) in the GPU may provide access to the HW stack 132. In other words, to access the HW stack 132, the VBIOS may point to CR90 by writing an appropriate value to the index location 0x3D4. Data written to CR90 (by writing to location 0x3D5) may then be automatically pushed onto the HW stack 132, while data read from CR90 (by reading from location 0x3D5) may be automatically popped from the HW stack 132.

In some cases, the HW stack 132 may be placed in an automatic mode (e.g., by writing to one or more other control registers CTRL1 and/or CTRL2 of the GPU) where a pointer 136 to a current position in HW stack 132 is automatically incremented on a push and automatically decremented on a pop. The HW stack 132 may also be operated in a manual mode where the pointer is incremented or decremented manually. Operating the HW stack 132 in the automatic mode may be preferable in many cases, as it will result in reduced software execution times, as the VBIOS can take advantage of high speed string move instructions which allow cycling through a very quick loop of writes/reads to transfer data to/from the HW stack 132.

In some cases, access to the HW stack 132 may be enabled/disabled via one or more control registers 138 on the GPU. One or more bits of the control register 138 may be written to enable/disable access to the HW stack 132. In other words, circuitry on GPU that detects writes to the HW stack 132 may ignore these writes if access is disabled, while another one or more bits may be written to select an automatic mode where the pointer is automatically adjusted when pushing or popping data or to select a manual mode where the pointer is manually adjusted.

In some cases, measures may be taken to reduce the likelihood of other software components inadvertently accessing the HW stack 132 concurrently with the VBIOS, which may have catastrophic effects by modifying stack contents and/or the pointer. For example, the VBIOS may write to a control register to enable access to the HW stack 132, quickly offload data from the shared stack and subsequently disable access. To restore the data from the HW stack 132 to the shared stack, the VBIOS may again enable access, quickly restore the previously offloaded data, and subsequently disable access.

In some cases, the control registers used to enable access to the HW stack 132 may be protected registers, meaning they are not readily or directly accessible to other software component in the system. For example, these registers may be accessible only via relatively complex interface mechanism, which may significantly reduce the likelihood of other software components inadvertently enabling (and subsequently accessing) the HW stack 132.

Other registers may also be provided for diagnostic purposes. For example, the pointer may be mapped to a control register where it can be quickly read to determine the location to which it is currently pointing. Further, a status register (illustratively shown as CR91) may be provided with error flags that gives some indication, for example, of stack overflow (pushed more data than the stack will hold) or underflow (popped more data than was pushed).

Offloading Data to the Hardware Stack

Figure 3:
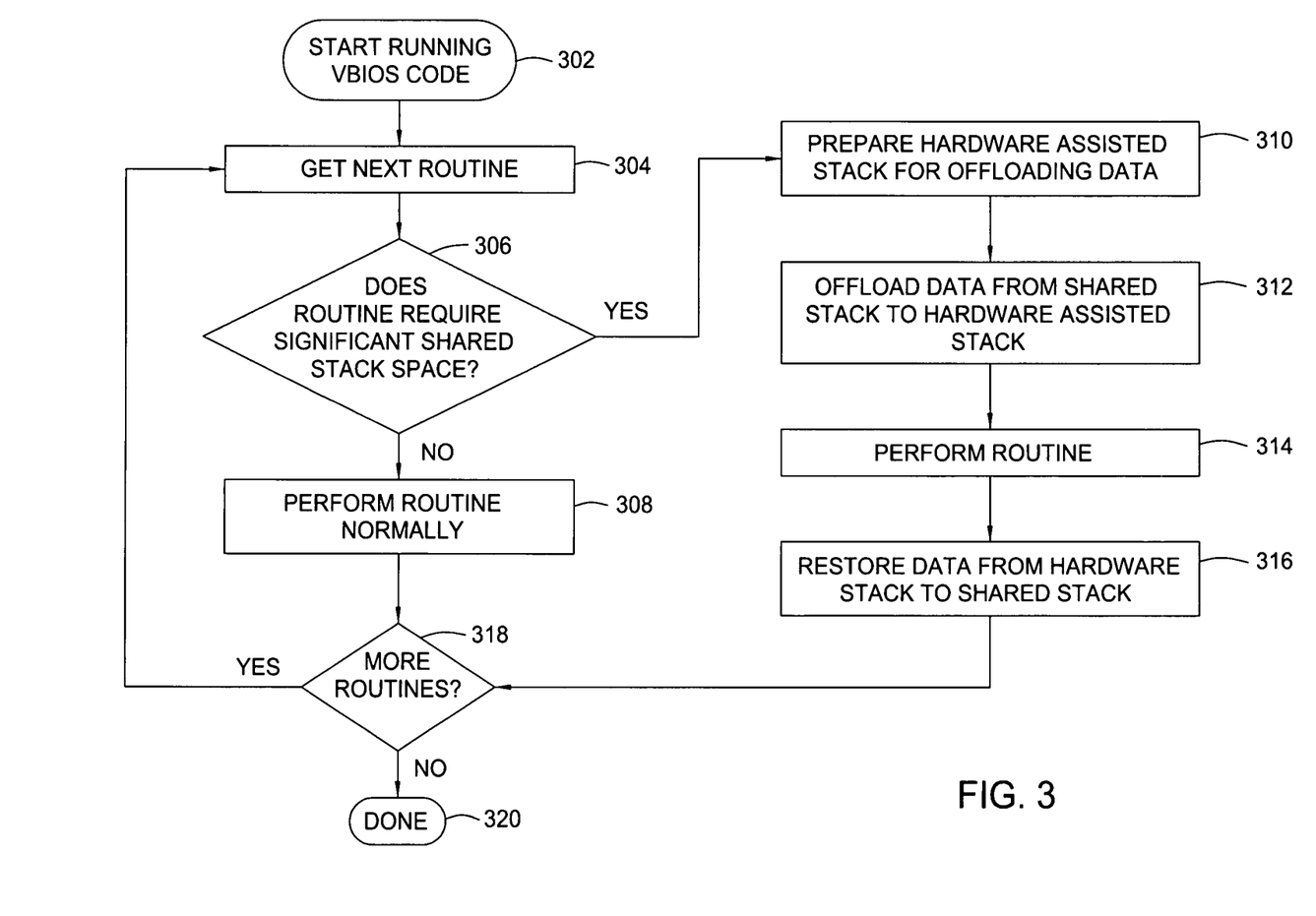
FIG. 3 is a flowchart of exemplary operations for minimizing the impact of a portion of code on shared stack space utilizing a hardware assisted stack, according to one embodiment of the present invention.

FIG. 3 is a flow diagram of exemplary operations illustrating how the VBIOS may utilize the hardware stack to reduce its impact on the shared stack. At step 302, the VBIOS code starts running and, at step 304, the next (first) routine is retrieved. If the routine does not require a significant amount of shared stack space, as determined at step 306, the routine is performed normally, at step 308 (i.e., without offloading data to the HW stack). In some cases, this determination may actually be made by software developers who may insert offloading and restoring operations into the code accordingly.

For example, if the routine requires only a few bytes of shared stack space, the extra I/O cycles required to offload data to the HW stack may not be warranted. On the other hand, if the routine does require a significant amount of shared stack space, offloading data from the shared stack to the HW stack may be warranted and may reduce the likelihood of the system exceeding the shared stack.

Therefore, at step 310, the HW stack is prepared for offloading data. For example, as previously described, the VBIOS may enable access to the HW stack by writing to one or more control registers and configure the HW stack for automatic or manual mode. At step 312, data is offloaded from the shared stack to the HW stack. At step 314, the routine is performed. After performing the routine, data from the HW stack is restored to the shared stack, at step 316. While not illustrated, the VBIOS may disable access to the HW stack immediately after offloading or restoring data, in an effort to reduce the chances of another routine inadvertently accessing the HW stack.

If there are more routines to be performed, as determined at step 318, the operations 304-316 may be repeated. Otherwise, if there are no more routines to be performed (e.g., no more VBIOS code to execute) the operations may terminate, at step 320.

Figure 4A:
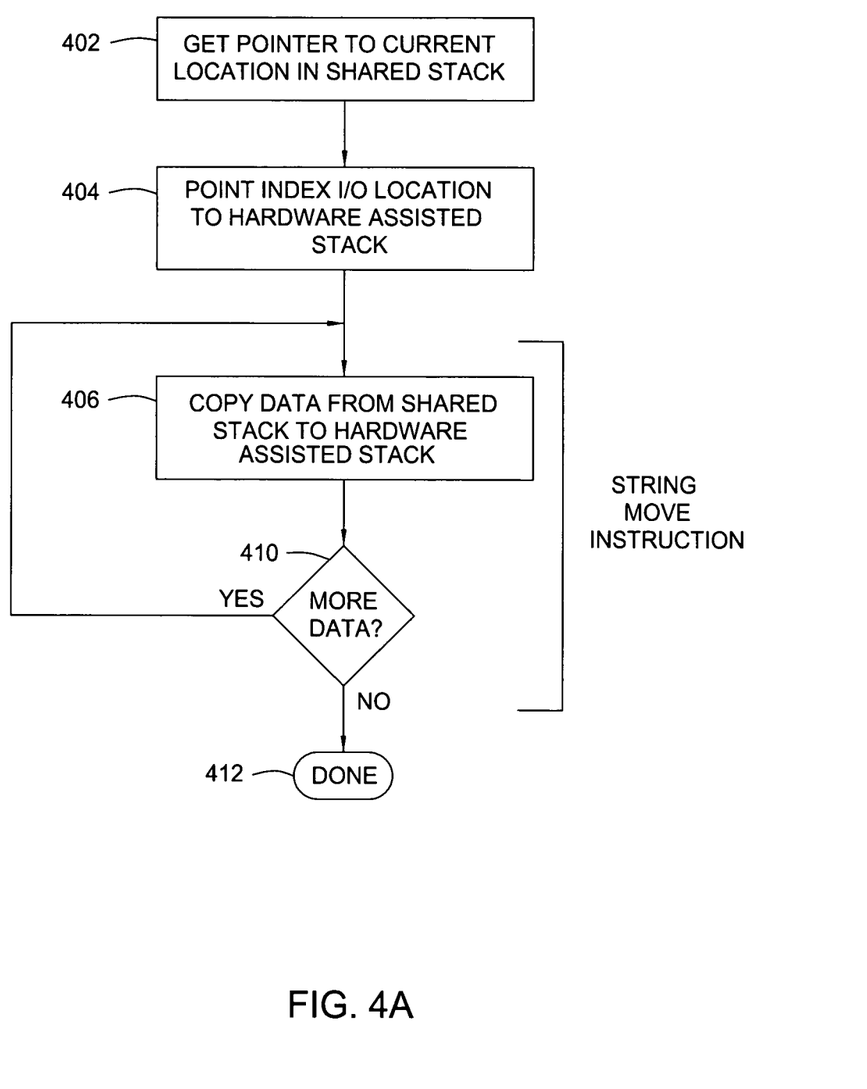
FIGS. 4A and 4B are flowcharts of exemplary operations for offloading data to and restoring data from, respectively, a hardware assisted stack, according to one embodiment of the present invention.
Figure 4B:
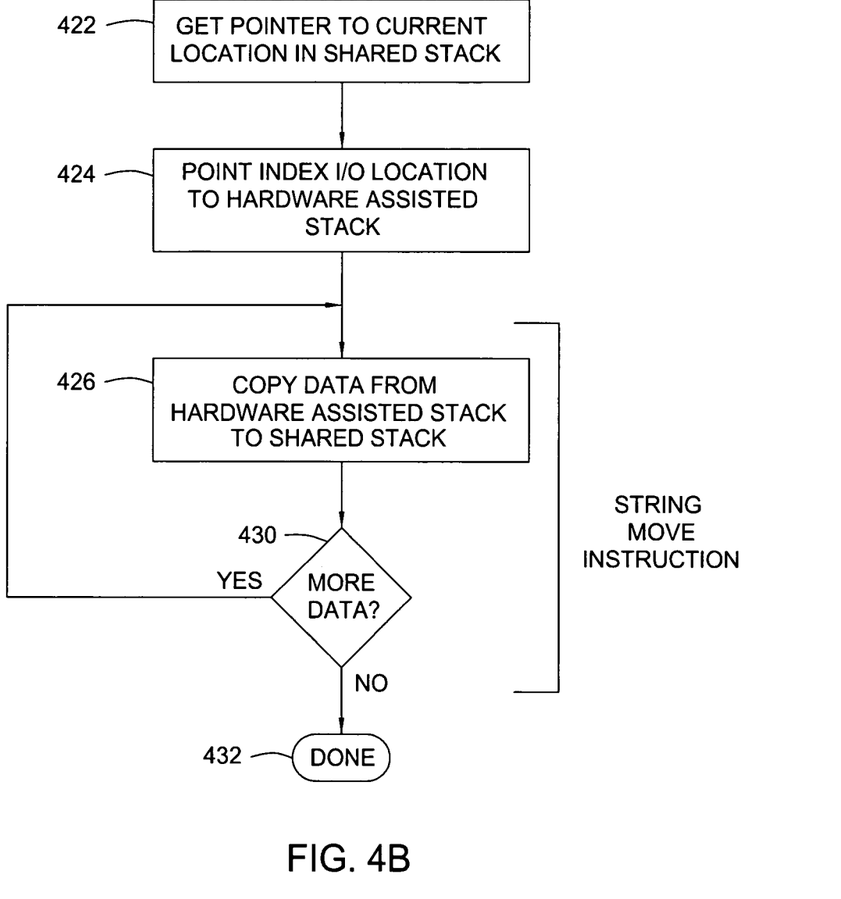

FIGS. 4A and 4B illustrate exemplary operations for offloading data to the HW stack and restoring data from the HW stack, respectively. While not illustrated, these figures assume that access to the HW stack has been enabled.

Referring first to FIG. 4A, the offloading operations begin, at step 402, by getting a pointer to the current location in the shared stack. At step 404, the VBIOS points the index I/O location (e.g., location 0x3D4) to the HW stack (e.g., CR90). A loop of operations 406-410 is then entered to transfer the data (e.g., one byte at a time) from the shared stack to the HW stack. As illustrated, for some embodiments, the loop of operations 406-410 may be performed automatically as part of a string move instruction. String move instructions are very basic loop instructions that are available in real mode to move strings of data from one location to another. An advantage to using these instructions is that the CPU cannot typically be interrupted during their execution.

At step 406, a byte of data is copied from (popped off of) the shared stack (and pushed on) to the HW stack. As previously described, pushing the data onto the HW stack may simply involve writing the data to an I/O location (e.g., 0x3D5). If the HW stack was configured for automatic mode, the pointer may be automatically incremented to point to the next location. Otherwise, the pointer may need to be manually incremented (e.g., by performing another I/O operation to write to another control register). In either case, if there is more data to offload, as determined at step 410, these offload operations may be repeated. Otherwise, the offload operations are terminated, at step 412.

Referring next to FIG. 4B, the restoring operations begin, at step 422, by getting a pointer to the current location in the shared stack. At step 424, the VBIOS points the index I/O location to the HW stack. A loop of operations 426-430 is then entered to restore the data from the HW stack to the shared stack. At step 426, a byte of data is copied from (popped off of) the HW stack (and pushed on) to the shared stack. As previously described, popping the data from the shared stack may simply involve reading data from the I/O location (e.g., 0x3D5).

Again, if the HW stack was configured for automatic mode, the pointer may be automatically decremented to point to the next location. Otherwise, the pointer may need to be manually decremented. In either case, if there is more data to restore, as determined at step 430, these restoring operations may be repeated. Otherwise, the restore operations are terminated, at step 432.

In some cases, VBIOS operations may be nested, resulting in multiple offloads to the HW stack before any data is restored. In other words the data from one offload may be pushed onto the HW stack on top of the data from a previous offload. When restoring this data, the software should know how much data was offloaded each time in order to restore the correct amount. For some embodiments, when offloading data, some type of "housekeeping" data may also be pushed onto the HW stack to assist software when restoring the data.

Figure 5A:
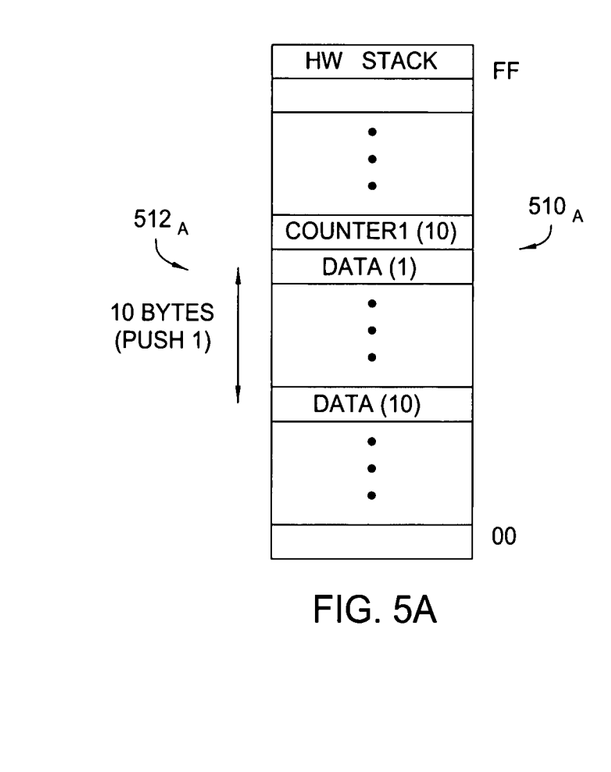
FIGS. 5A and 5B are diagrams illustrating storing housekeeping information in a hardware assisted stack, according to one embodiment of the present invention.
Figure 5B:
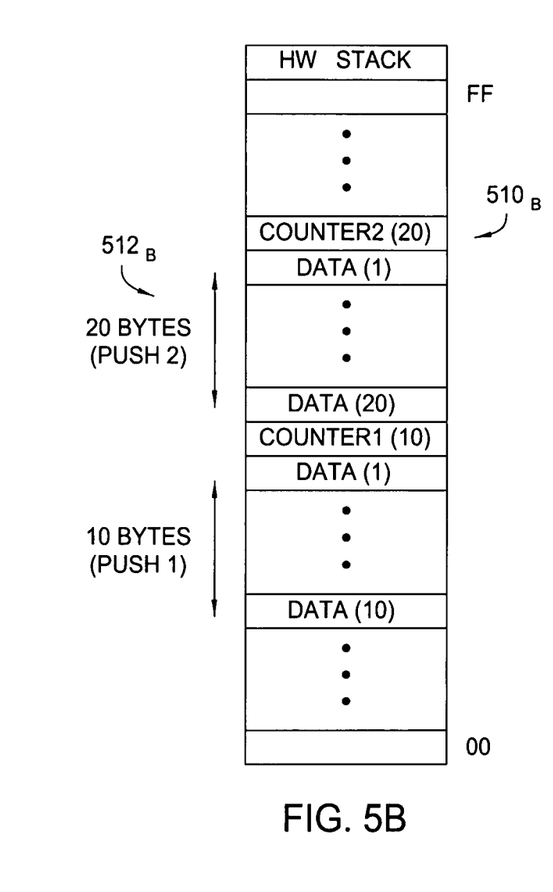

For example, as illustrated in FIG. 5A, a counter $510_A$ may be pushed onto the HW stack that indicates a number of bytes of data $512_A$ that has just been offloaded from the shared stack. When a subsequent offload occurs, resulting in additional amount of data $512_B$ being pushed on top of the data $512_A$, another counter $510_B$ can be pushed to reflect the number of bytes of that data. When subsequently restoring this data (e.g. in separate restore operations), these counters can be popped off the HW stack and read by the software to determine how many additional bytes were previously offloaded and need to be restored.

Figure 6A:
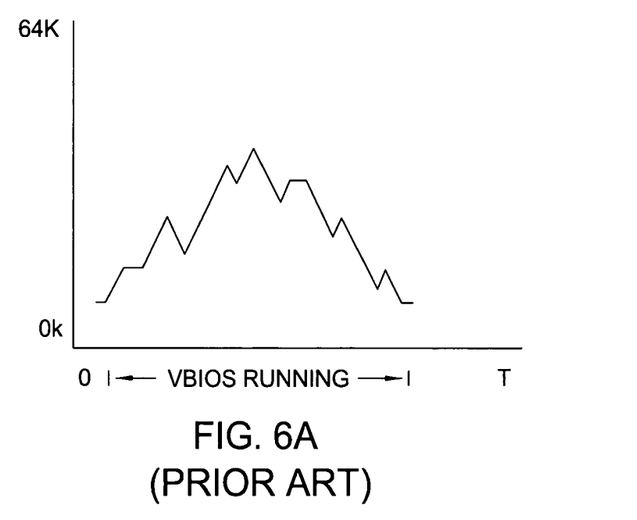
FIGS. 6A and 6B are diagrams of shared stack space consumption of code with and without utilizing a hardware assisted stack.
Figure 6B:
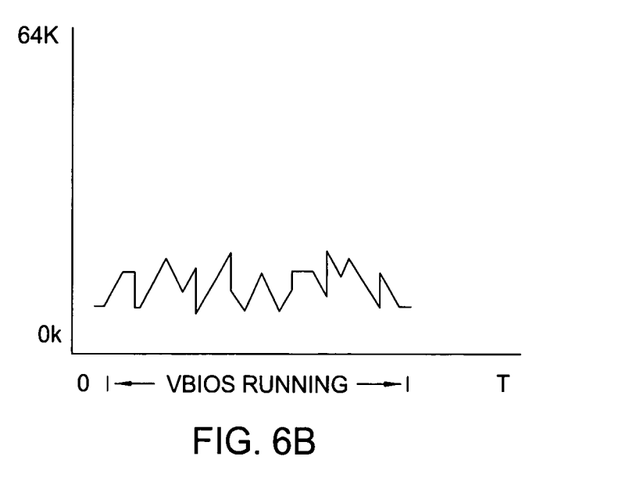

The impact of utilizing the HW stack to offload data is illustrated in FIGS. 6A and 6B which illustrate shared stack space consumption with and without offloading data to the HW stack, respectively. As illustrated in FIG. 6A, as the VBIOS is running, the stack space consumption will generally tend to increase, for example, as different VBIOS routines continue to add data onto the shared stack.

As illustrated in FIG. 6B, however, if data from the shared stack is offloaded periodically (e.g., prior to performing routines that require a significant amount of shared stack space), the maximum amount of stack space consumed at any given time may be significantly reduced. In other words, before an additional amount of data is added to the shared stack (a very limited resource) when performing a particularly complex routine, a portion of data already existing on the stack is offloaded to the HW stack while that routine is performed. The shared stack space consumed by the routine will already be freed up before the offloaded data is restored. Fortunately, programmers can readily identify routines that will likely require significant amount of shared stack space and can add appropriate offload and restoration operations to the VBIOS (or any other type) code.

While the foregoing is directed to embodiments of the present invention, other and further embodiments of the invention may be devised without departing from the basic scope thereof, and the scope thereof is determined by the claims that follow.

The invention claimed is:

1. A method of reducing the impact of a first software routine on a shared stack of a computing system in which the first software routine is running, comprising:
   determining that the first software routine accesses a larger portion of data stored in the shared stack relative to other software routines executing within the computing system;
   enabling access to a hardware assisted stack;
   prior to executing the first software routine, offloading the larger portion of data from the shared stack to the hardware assisted stack mapped to an address space accessible to the first software routine;
   pushing a counter onto the hardware assisted stack that indicates the size of the larger portion of data;
   disabling additional access to the hardware assisted stack such that only the first software routine is able to access the hardware assisted stack;
   executing the first software routine;
   identifying the larger portion of data offloaded to the hardware assisted stack based on the counter pushed onto the hardware assisted stack; and
   restoring the larger portion of data from the hardware assisted stack to the shared stack when the first software routine is executed.

2. The method of claim 1, wherein:
   the hardware assisted stack resides on a graphics processing unit (GPU); and
   the first software routine comprises video basic input/output system (VBIOS) code.

3. The method of claim 1, wherein the offloading comprises:
   writing an index value to a first input/output (I/O) location to point to the hardware assisted stack; and
   repeatedly writing data popped from the shared stack to a second I/O location to push that data onto the hardware assisted stack.

4. The method of claim 3, further comprising:
   placing the hardware assisted stack in an automatic mode wherein a pointer to the hardware stack is automatically adjusted each time data is pushed on the hardware assisted stack.

5. The method of claim 1, further comprising:
   accessing one or more registers of a device on which the hardware stack resides to determine an error status of the hardware stack.

6. The method of claim 1, wherein enabling access to the hardware assisted stack comprises writing to one or more protected registers via an interface mechanism to enable the hardware assisted stack, wherein the one or more protected registers are not accessible to the first software routine or to the other software routines executing within the computer system.

7. An integrated circuit (IC) device, comprising:
   a shared stack for executing a first software routine;
   a hardware assisted stack with a plurality of storage locations;
   at least one control register having one or more bits writable to enable and disable access to the hardware assisted stack; and
   interface circuitry configured to:
      detect externally supplied write operations targeting a specified input/output (I/O) location and, in response, push data contained in the write operations onto the hardware assisted stack, and
      detect externally supplied read operations targeting the same or a different specified I/O location and, in response, pop data from the hardware assisted stack and return the popped data,
   wherein, when the first software routine accesses a larger portion of data stored in the shared stack relative to other software routines, the hardware assisted stack is enabled, the larger portion of data is offloaded from the shared stack to the hardware assisted stack mapped to an address space accessible to the first software routine, a counter is pushed onto the hardware assisted stack that indicates the size of the larger portion of data, additional access to the hardware assisted stack is disabled such that only the first software routine is able to access the hardware assisted stack, the larger portion of data offloaded to the hardware assisted stack is identified based on the counter pushed onto the hardware assisted stack, and the larger portion of data is restored from the hardware assisted stack to the shared stack when the first software routine is executed.

8. The device of claim 7, wherein the device is a graphics processing unit (GPU).

9. The device of claim 7, wherein:
   data is pushed onto and read from locations in the stack indicated by a pointer; and
   the device further comprises at least one control register having one or more bits writable to enable automatic adjustments to the pointer when pushing and popping.

10. The device of claim 7, further comprising a status register having one or more bits indicating at least one of: a stack overflow and a stack underflow.

11. The integrated circuit device of claim 7, wherein enabling access to the hardware assisted stack comprises writing to one or more protected registers via an interface mechanism to enable the hardware assisted stack, wherein the one or more protected registers are not accessible to the first software routine or to the other software routines executing within the computer system.

12. A system comprising:
   at least one central processing unit (CPU);
   one or more software routines executable by the CPU;

a shared stack accessible by the one or more software routines; and a hardware assisted stack mapped to an address space accessible to at least a first one of the one or more software routines;

wherein the first software routine is configured to, during the software routine's execution by the CPU, determine that the first software routine accesses a larger portion of data stored in the shared stack relative to other software routines, enable access to a hardware assisted stack, offload the larger portion of data from the shared stack to the hardware assisted stack mapped to an address space accessible to the first software routine, push a counter onto the hardware assisted stack that indicates the size of the larger portion of data, disable additional access to the hardware assisted stack such that only the first software routine is able to access the hardware assisted stack, identify the larger portion of data offloaded to the hardware assisted stack based on the counter pushed onto the hardware assisted stack, restore the larger portion of data from the hardware assisted stack to the shared stack when the first software routine is executed.

13. The system of claim 12, wherein the first software routine is further configured to:

perform one or more routines after offloading data from the shared stack to the hardware assisted stack; and subsequently, restore the offloaded data from the hardware assisted stack to the shared stack.

14. The system of claim 12, wherein the first software routine is configured to offload data to the hardware assisted stack by:

writing an index value to a first input/output (I/O) location to point to the hardware assisted stack; and write data popped from the shared stack to a second I/O location to push that data onto the hardware assisted stack.

15. The system of claim 12, wherein the hardware assisted stack resides on a graphics processing unit.

16. The system of claim 15, wherein the first software routine comprises video basic input/output system (VBIOS) code.

17. The system of claim 12, wherein enabling access to the hardware assisted stack comprises writing to one or more protected registers via an interface mechanism to enable the hardware assisted stack, wherein the one or more protected registers are not accessible to the first software routine or to the other software routines executing within the computer system.

* * * * *